FIG. 1.

INVENTOR.
ROBERT E. BOYDEN
EDWARD P. DRAKE
BY
Fred N. Schwend
ATTORNEY

FIG. 3.

INVENTORS
ROBERT E. BOYDEN
EDWARD P. DRAKE

Patented Sept. 2, 1952

2,609,145

UNITED STATES PATENT OFFICE 2,609,145

CLUTCH CONTROL MECHANISM

Robert E. Boyden, Los Angeles, and Edward P. Drake, Glendale, Calif., assignors to Clary Multiplier Corporation, Los Angeles, Calif., a corporation of California Original application November 19, 1946, Serial No. 710,880. Divided and this application March 28, 1949, Serial No. 83,904

12 Claims. (Cl. 235—62)

This invention relates to motor driven calculating machines and has particular reference to means for controlling a plurality of clutch operated mechanisms of such a machine in different manners in order to perform different types of operations.

The present application is a division of our copending application, Serial No. 710,880, filed November 19, 1946, which has since matured into Patent Number 2,515,692, issued on July 18, 1950, to which application reference is had for a complete disclosure of a calculating machine in which the present invention is embodied. It is to be understood however, that the invention may equally well be applied to other forms of calculating machines embodying a plurality of clutch operated mechanisms.

One object of the present invention is to provide a pair of cyclically operable clutch operated mechanisms, operation of one of which is controlled by operation of the other and vice versa.

Another object is to provide a clutch control for a pair of cyclically operable clutch operated mechanisms wherein one clutch is operable through a complete cycle to perform one type of operation and wherein the clutches are operable through interspersed cyclic phases to perform another type of operation.

The manner in which the above and other objects of the invention are accomplished will be readily understood on reference to the following specification when read in conjunction with the accompanying drawings wherein:

Since the machine in which the present invention is embodied in its preferred form is disclosed in detail in our aforementioned application only a brief description of the operation of the same will be mentioned herein and for the sake of brevity only that mechanism which embodies the present invention or cooperates therewith will be described in detail.

Figure 1:
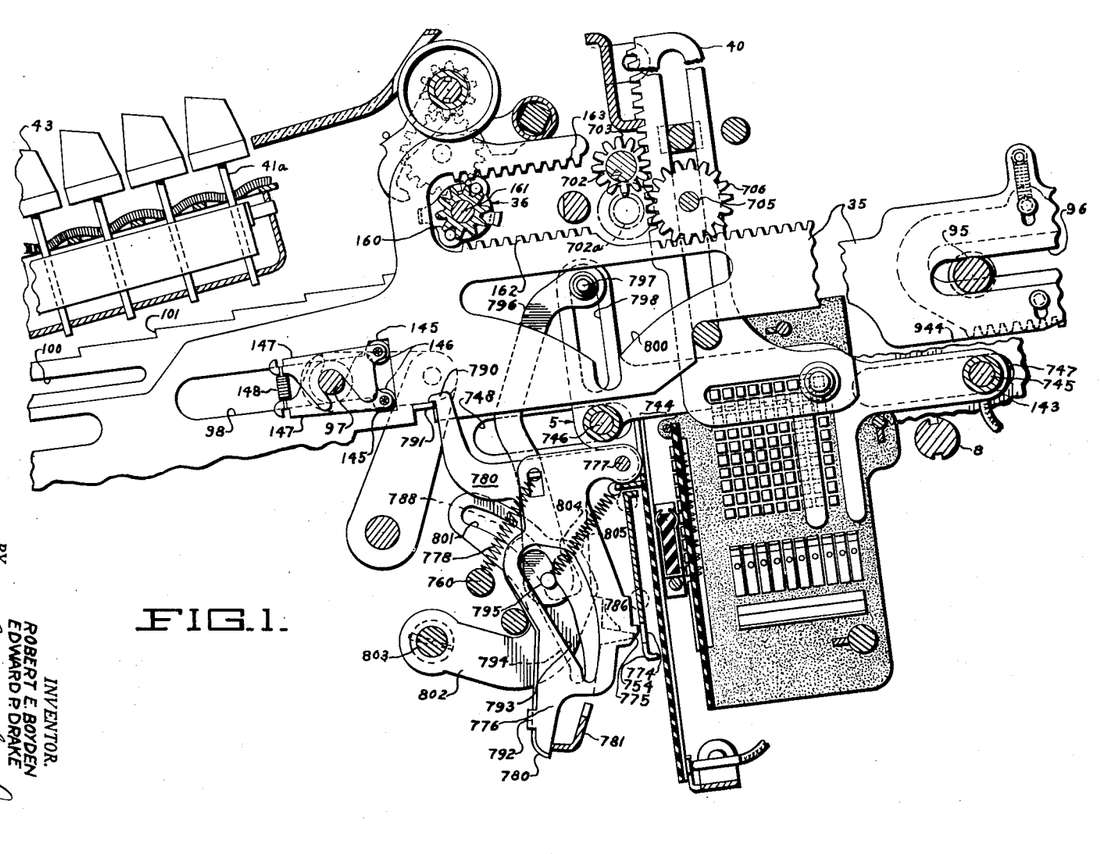
Fig. 1 is a longitudinal sectional view through a machine embodying a preferred form of the present invention.

The machine is of the reciprocating rack type comprising a plurality of ordinally spaced differentially operable racks, one of which is shown at 35 (Fig. 1). Each rack is supported for fore and aft movement at the rear by a cross-shaft 95 embraced by an open slot 96 formed in the rack. At its forward end, each rack is supported by a rack drive shaft 97 suitably guided for fore and aft movement in slots one of which is shown at 142 (Fig. 2) formed in machine side frames 143. The shaft 97 extends through and is movable along slots 98 formed in the various racks.

For the purpose of differentially controlling the extent of travel of the racks, there is provided in operative relation to each rack a series of keys 43, forming part of a keyboard. Each key 43 is depressible into a set position wherein a keystem 41a thereof is positioned to be engaged by a shoulder 101 of a rack stop bar 100, which, for the purpose of the present disclosure, may be considered as attached to its respective rack in the position illustrated.

The racks 35 are arranged to enter amounts into or total amounts out of accumulators, one of which is generally indicated at 36. The controls and construction of these accumulators are disclosed in our aforementioned application and the construction is disclosed and claimed in the application of E. P. Drake, Serial No. 582,554, filed March 13, 1945, which has since matured into Patent No. 2,472,696, issued on June 7, 1949. The accumulator 36 comprises a plurality of ordinally arranged accumulator gears 160 rotatably mounted on a shaft 161 which may be raised or lowered to selectively mesh the gears 160 with either upper rack gear sections 163 or lower rack gear sections 162 of the racks 35 in accordance with the type of problem to be performed. That is, during an operation in which amounts are to be additively added into the accumulator, the latter is lowered to mesh the gears 160 with the rack gear sections 162 in advance of the forward movement of the racks whereby the gears will be rotated in a clockwise direction. During a subtractive or totalling operation, the accumulator is raised to mesh the gears 160 with the upper rack sections 163 in advance of forward movement of the racks 35 so that the racks will rotate the gears in a counter-clockwise direction.

Power for the various mechanisms of the machine is obtained through a cyclically operable main clutch 7 (Fig. 3) and a cyclically operable multiplier clutch 9, which clutches are controlled by various ones of depressible control bars (to be described later) and by each other. The clutches are driven by a motor 420 having a worm 421 on the motor shaft thereof which meshes with a worm gear 422 rotatably mounted on a cross shaft 423 and suitably fixed to a spur gear 424. The latter gear meshes with a main clutch driving gear 425, rotatably mounted on a main shaft 8, and a multiplier clutch driving gear 426, rotatably mounted on a multiplier shaft 10.

Figure 2:
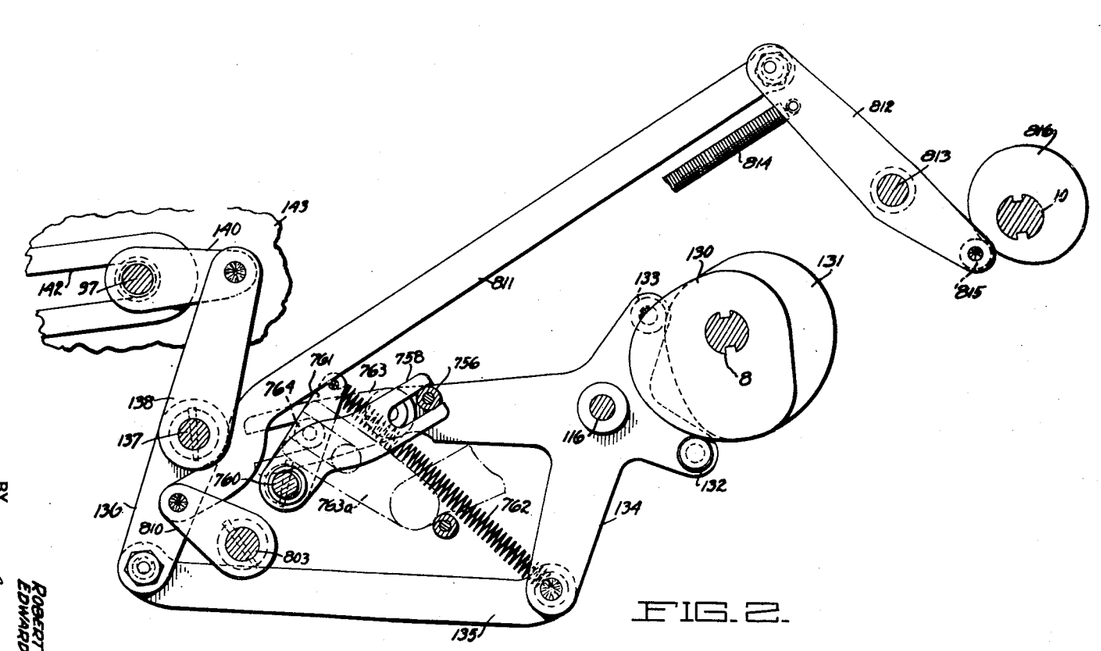
Fig. 2 is a side elevation showing the mechanism for driving the main racks and for controlling the multiplier digit selecting mechanism.

Means are provided for yieldably transmitting a drive from the main shaft 8 (Figs. 2 and 3), when the latter shaft is operated by the main clutch 7, to the racks 35. Referring to Fig. 2, a pair of complementary rack drive cams 130 and 131 are keyed to the aforementioned shaft 8. These cams are engaged by rollers 132 and 133 of a cam follower 134 pivoted at 116 and connected by a link 135 to an arm 136 fastened on a rockable shaft 137. Also secured to the shaft 137 are spaced arms 138 connected by links 140 to the aforementioned rack drive shaft 97, whereby to transmit fore and aft movement to the latter shaft.

The slot 98 in each of the drive racks 35 (Fig. 1) terminates at its rear in opposed laterally disposed notches 145. Each of these notches is normally engaged by a roller 146 carried on a carrier 147 pivoted on the shaft 97. The two carriers 147 associated with any one rack are spring urged in opposite directions by a tension spring 148 extending therebetween to yieldably maintain the rollers 146 in engagement in the notches 145 to thereby form a yieldable connection between the drive shaft and each of the different drive racks 35.

In the operation of the machine to perform an additive entry of a factor into the accumulator 36, the factor is set into the keyboard and an add bar 15 (Fig. 5) is depressed, causing operation of the machine and engagement of the main clutch 7 (Fig. 3) to operate through a complete cycle. Means (not shown) are also provided under control of the add bar 15 to cause the accumulator 36 to mesh with the lower rack gear section 162 of rack 35.

Figure 5:
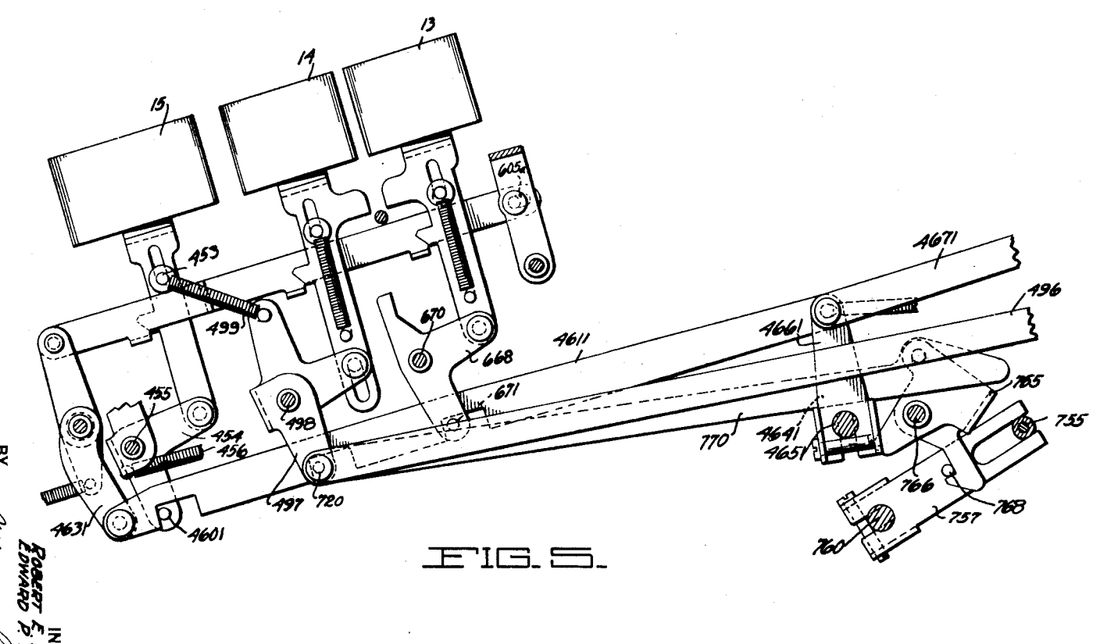
Fig. 5 is a side elevation illustrating part of the machine controls including the add and multiplication control bars.

Referring to Fig. 5, the stem of the add bar is provided with a vertical slot guided over a frame pin 453. The lower end of the stem is pivotally connected to a bellcrank 454, pivoted at 455, and urged counter-clockwise by a spring 456 to normally hold the add bar in its illustrated raised position. A pin 4601 on the lower arm of the bellcrank 454 extends within a notch in a clutch control bar 4611. The latter is supported for lengthwise movement by swinging arms 4631 and 4641, the latter being fastened to a rockable shaft 4651 to which is also fastened a similar arm 4661 connected to the forward end of a second clutch control bar 4671.

Figure 3:
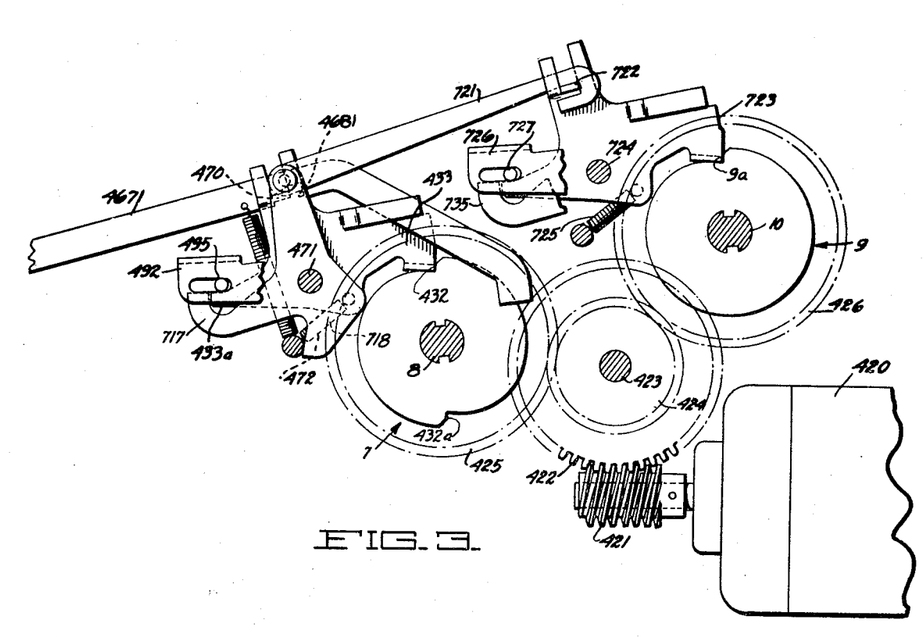
Fig. 3 is a side elevation illustrating part of the controls for the main and multiplier clutches and the motor drive therefor.

Referring to Fig. 3, the link 4671 is provided with a notch 4681 normally embracing an ear 470 on a clutch control lever 433. The latter is pivoted at 471 and is urged clockwise into engagement with a full cycle shoulder 432 of the main clutch by a spring 472 to normally hold the clutch in disengaged condition. However, upon depression of the add bar 15 and consequent forward movement of the bars 4611 and 4671, the control lever 433 will be rocked counter-clockwise out of engagement with the shoulder 432 to cause engagement of the main clutch.

As the main clutch advances through its first 180° of rotation, an ear 490 on a camming member 491, secured to the main shaft 8, moves into engagement with a shoulder 489 located at the rear end of the clutch control bar 4671, rocking the same upward out of engagement with the ear 470 on the clutch lever 433 so that the latter can move against the periphery of the clutch under the action of its spring 472.

Although the clutch lever 433 is capable of arresting operation of the main clutch 7 at the end of the first phase thereof or at approximately 180° of rotation by engaging a second shoulder 432a thereon, it is prevented from doing so during addition operations. For this purpose, a camming lever 492 (Figs. 3 and 4) is also pivoted at 471 independently of the clutch lever 433 and is normally held in its illustrated position by a spring 493. A slot 494 is formed in the lever 492 to guide a pin 495 carried on a link 496 into either of two positions therealong. The latter is pivotally supported at its forward end by a bellcrank 497 (Fig. 5) pivoted at 498 and normally held in a counter-clockwise illustrated position by a spring 499 so as to maintain the pin 495 in its rearmost illustrated position along the slot 494. During addition, the position of the link 496 is unaltered, thereby holding the pin 495 over a tail 433a of the clutch control lever 433.

Figure 4:
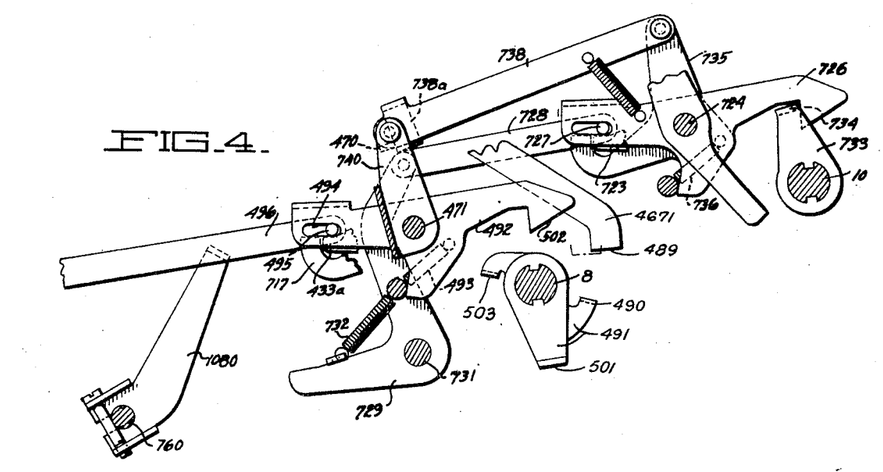
Fig. 4 is a side elevation illustrating further controls for the main and multiplier clutches.

Toward the mid-cycle or first phase of the main clutch, camming member 491 keyed on the main shaft 8 carries an ear 501 thereof against a camming edge 502 on the lever 492, thereby rocking the latter counter-clockwise to force the pin 495 to likewise rock the clutch control lever 433. Thus, the latter will be rocked outward away from the clutch 7 to relocate its ear 470 in the notch 4681 of the clutch control bar 4671 just as the shoulder 432a of the latter passes its mid-cycle position so that the control lever 433 will be ineffective to arrest the clutch at this point. Therefore, the clutch will continue through the second half of its cycle and during that time an ear 503 on member 491 again disengages the clutch control bar 4671 from the clutch control lever 433. Therefore, at the end of the cycle the lever 433 will engage the full cycle shoulder 432 of the clutch to disengage the same.

As disclosed in detail in our aforementioned application, multiplication is accomplished in the present machine by first entering the multiplicand into the keyboard and depressing a first factor entry bar 13 (Fig. 5). The latter, upon depression, is effective to actuate the clutch control bar 4611 in the same manner as the add bar 15. That is, the bar 13 is connected to a bellcrank 668 pivoted at 670 and provided with a pin 671 extending into a notch formed in the clutch control bar 4611.

The bar 13 is also effective through means, not shown, to cause a shaft 702 (Fig. 1), carrying gears 703 which mesh with vertically movable racks 40, to move downwardly along the racks 40 to an alternate position 702a wherein the gears 703 mesh with idlers 706. The latter idlers, in turn, are in continual mesh with rack gear sections 705 formed on the racks 35 and when the gears 703 are thus meshed with both the racks 40 and idlers 706 the gear assembly will transmit motion between the racks 35 and the racks 40. Therefore, during subsequent advance movement of the racks 35, the racks 40 will be vertically advanced to positions indicative of the multiplicand factor and will control the multiplication unit (not shown) accordingly.

The multiplier is thereafter entered into the machine by setting this factor into the keyboard and depressing a second factor bar 14. The latter will initiate operation of the main clutch and will condition the same to become disengaged at the end of the first phase or 180° of rotation and to initiate operation of the multiplier clutch 9 to cycle a number of times depending on the number of significant digits in the multiplier factor. At the completion of the multiplication, the multiplier clutch will become disengaged and will effect reengagement of the main clutch 7 to complete its second phase of 180° of rotation so as to return to its illustrated full-cycle position.

Referring to Fig. 5, depression of the bar 14 will rock bellcrank 497 about its pivot 498 against the action of spring 499 to draw the aforementioned link 496 (see also Fig. 4) forward so as to move the pin 495 thereon into a forward position wherein it overlies the bellcrank 717 (see also Fig. 3). Thus, the pin will be ineffective to rock the lever 492 to remove the clutch lever 433 from the periphery of the clutch toward the end of the first 180° of rotation and, consequently, the main clutch will become automatically disengaged at that time. The bellcrank 717 is pivoted at 471 independently of the levers 433 and 492 and is urged clockwise into its illustrated position by a spring 718. The bar 14 is held depressed, through means not shown, throughout the multiplication operation and therefore the pin 495 will be retained over the tail of bellcrank 717 until the end of such operation.

It will be noted on reference to Fig. 5 that the pivot pin 720, connecting the link 496 to the bellcrank 497, extends into a notch in the clutch control bar 4611 so that, as the second factor bar 14 is depressed, this pin will draw the clutch control bar forward to cause engagement of the main clutch in the same manner as described in connection with the add and first factor entry operations.

Operation of the main clutch, through the rack drive means hereinbefore described, causes the racks 35 to differentially advance to positions controlled by depressed ones of the various amount keys 43 so as to mechanically represent the value of the multiplier factor set up in the keyboard.

Toward the end of the first 180° of operation of the main clutch, the ear 501 (Fig. 4) of member 491 will cam the lever 492 counter-clockwise, causing the pin 495, which is now located over the tail of bellcrank 717, to likewise rock the latter. The bellcrank is connected through a link 721 (Fig. 3) to a multiplier clutch control lever 723, similar in construction and function to the lever 433. Thus the lever 723 will be rocked counter-clockwise against the action of its spring 725 to cause engagement of the multiplier clutch 9. It is to be noted that at this time the racks 35, or at least those that have been advanced, will be left in their advanced positions and will remain therein until the end of the multiplication operation.

A lever 726, similar to lever 492, is pivoted at 724 and is urged clockwise by a spring 736. This lever is provided with an elongated slot which guides a pin 727 carried by a link 728 pivotally connected at its forward end to a bellcrank 729. The bellcrank is fulcrumed at 731 and normally held in its illustrated position by a spring 732 to thereby hold pin 727 in the rear portion of this slot wherein it overlies a tail formed on the clutch control lever 723.

Keyed on the multiplier shaft 10 is a member 733 having an ear 734 thereon. The latter is effective to cam the lever 726 counter-clockwise just prior to the end of a multiplier clutch cycle, thereby causing the pin 727 to hold the clutch control lever 723 away from the periphery of the clutch as a full cycle indentation 9a therein moves past the tip of lever 726. Consequently the clutch will continue through a new cycle.

The above re-cycling of the multiplier clutch will continue until the multiplicand has been multiplied by each significant digit of the multiplier at which time the bellcrank 729 is rocked counter-clockwise (as will be described hereinafter) to position the pin 727 in the forward end of the slot in the lever 726 and in a position overlying the tail of the bellcrank 735. The latter is normally held in the position shown by a spring 736 and is connected by a link 738 to a bail 740 pivoted at 471. As the multiplier clutch approaches the end of its final cycle, with the pin 727 located in its forward position, the camming member 733 on shaft 10 will again rock the lever 726 counter-clockwise but since the clutch control lever 723 is now permitted to engage the full cycle indentation 9a of clutch 9, the latter will become automatically disengaged. On the other hand, the bellcrank 735 will be rocked by the pin 727, forcing a bent-over projection 738a on the link 738 to engage the ear 470 (see also Fig. 3) of the main clutch control lever 433 to reengage the latter clutch so that it will complete its second phase or 180° of operation.

As previously described, multiplication is performed by successively multiplying all digits of the multiplicand by the successive significant digits of the multiplier, i. e., by one multiplier digit at a time. Consequently means are provided for sequentially causing successively higher denominational ones of the racks 35 to control the multiplication process. For this purpose the latter means is arranged to control the multiplication unit which is not completely disclosed herein. Suffice it to say, however, that the multiplication unit 5 is formed of a plurality of plates 744 held together as a unit by transversely extending rods 745 and 746. The latter are guided for fore and aft movement in guide slots 747 and 748, respectively, formed in the machine side frames 143.

Figure 6:
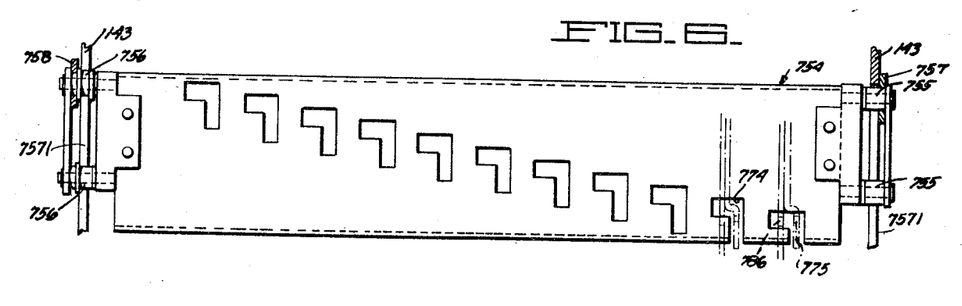
Fig. 6 is a front view of the multiplier digit selection control plate.

Means are provided for sequentially sensing the various racks 35 which have been advanced to represent multiplier digits and to maintain the multiplier clutch in engagement until multiplication by all significant digits of the multiplier has been completed. As shown in Figs. 1 and 6, a vertically shiftable control plate 754 extends across the machine and is mounted on rollers 755 on one side and 756 on the other, said rollers being guided in vertical slots 7571 formed in the machine side frames 143.

The plate 754 is guided vertically in parallel movement by yoked arms 757 (Fig. 5), and 758 (Fig. 2), which arms embrace the upper ones of the rollers 755 and 756, respectively. The arms are secured to a rockable shaft 760 to which is also secured an arm 761 urged clockwise by spring 762 to yieldably force the control plate 754 downwardly.

Two separate devices are provided to normally hold the plate 754 in its raised position illustrated in the drawings in all operations except multiplication. As shown in Fig. 2, a yoked arm 763 is pivoted to one arm of the cam follower 134 and embraces a roller 764 on the arm 761. When the main clutch and its shaft 8 are in full cycle position, the cam follower 134, controlled by cams 130 and 131, will cause arm 763 to maintain the plate 754 in its raised position, but during a main cycle the cam follower rocks counter-clockwise moving the arm 763 to its dot-and-dash line position 763a. It will be recalled that during multiplication, the main shaft 8 will be held in a half-cycle position and the cam follower 134 will therefore allow the plate 754 to move downward if not otherwise restrained.

A second device is provided to normally prevent downward movement of the plate 754. As shown in Fig. 5, a latch 765 is pivoted at 766 and is connected to the second factor key operated bellcrank 497 by a link 770. The latch is normally effective to latch a pin 768 on the arm 757 as illustrated.

Upon depression of the second factor bar 14, the link 770 will be drawn forwardly to cause the latch 765 to release the arm 757, permitting the plate 754 to move downwardly when the main shaft 8 is rotated sufficiently.

Referring to Fig. 6, it will be noted that the plate 754 is provided with a series of ordinally arranged L-shaped notches 774 arranged in echelon and progressing upwardly from the right hand order. The path of movement of the vertical leg of each notch is located in alignment with the nose 775 of an advance sensing lever 776 (Fig. 1), pivoted at 777 and urged counterclockwise by a spring 778. Juxtaposed selection control levers 780 are also pivoted at 777 and are urged counter-clockwise by springs 788. Levers 776 and 780 are normally held outward in their positions illustrated in Fig. 1 by a bail 781 operated by suitable control mechanism (not shown). However, during a multiplication operation, the bail 781 is retracted allowing the levers 776 and 780 in each order to move rearward by their respective springs, unless otherwise prevented from doing so as will presently appear, causing their noses 775 and 786, respectively, to either engage the side of the control plate 754 or to enter an aligned one of the notches 774. It will be noted that only one set of levers 776 and 780 will be effective to latch the control plate at any one time.

Means are provided for preventing a pair of levers 776 and 780 from blocking downward movement of the plate 754 when the associated rack is located in its zero position. An ear 791 on each rack is arranged to underlie a nose 790 on the associated lever 780 when the rack is located in its illustrated zero position. Thus, if a rack 35 is not advanced from its zero position its associated selecting lever 780 will be held outward against the action of its spring and the latter, in turn, will hold the associated sensing lever 776 outward by virtue of an ear 792 thereon overlying the lever 780. In this condition, the notch 774 in plate 754 aligned with said levers 776 and 780 will not be engaged and held. Therefore the plate 754 will be permitted to move downward until another notch therein will be engaged by a pair of levers 776 and 780 in a higher denominational order.

The plate 754, in conjunction with the pairs of levers 776 and 780, forms the means for sequentially causing the different racks 35 to control the multiplication operation. For this purpose, the levers 776 and 780 are provided with pear-shaped slots 793 and 794, respectively, therein through both of which (in each order) extends a pin 795 mounted on the lower end of a cam link 796. The upper end of the link carries a camming pin 797 which is slidable along a vertical guide slot 798 in the associated plate 744 of the aforementioned carriage 5. Also, the pin 797 extends into a triangular camming aperture 800 in the associated rack 35.

The pin 795 at the lower end of each link 796 also extends through an arcuate slot 801 formed in a juxtaposed lever 802 which is securely fastened to a rockable shaft 803, there being a lever 802 in each order of the machine. The slot 801 is provided with a shoulder 804 toward which the pin 795 is urged by a spring 805. The spring 805 also normally maintains the link 796 in its illustrated raised position. However, the slot 794 in the lever 780 normally prevents the pin 795 from moving to a position under the shoulder 804 unless the two associated levers 776 and 780 are allowed to rock into their blocking positions relative to the plate 754.

The shaft 803 and arms 802 secured thereto are oscillated once during each multiplying cycle. Therefore, when any set of levers 776 and 780 has moved into blocking relation with the plate 754, the associated pin 795 will have been positioned by its spring 805 below the shoulder 804 of the associated lever 802 and during the ensuing oscillation of the shaft 803, the link 796 will be drawn downwardly causing the pin 797 to cam along the engaging surface of the triangular aperture 800, thereby moving the carriage 5 lengthwise to a position corresponding to that of the associated rack 35.

Toward the end of the downward stroke of the lever 802 which is driving an associated link 796, the pin 795 of the link will cam along the forward edges of one or both of slots 793 and 794 in the associated levers 776 and 780, respectively, drawing the latter levers out of blocking relation to the plate 754 so that the latter will be free to move downward until blocked by the levers of the next higher order which contains a significant multiplier digit.

Referring to Fig. 2, the shaft 803 has an arm 810 secured thereto which is connected by a link 811 to a cam follower 812 pivoted at 813. The latter is provided with a roller 815 held against the periphery of a cam 816 by means of a spring 814. The cam 816 is carried by the multiplier shaft 10 and is therefore effective to oscillate the shaft 803 once during each multiplying cycle.

It will be seen from the foregoing that the plate 754 will progress downwardly as the multiplication operation ensues and will progressively advance the shaft 760 accordingly in a clockwise direction. Attached to the latter shaft is an arm 1030 (Fig. 4) which, when the plate 754 moves into its lowermost position, will engage the aforementioned bellcrank 729, rocking the same counter-clockwise to position the link 728 and pin 727 thereon, in a forward position which, as described hereinbefore, will effect termination of operation of the multiplier clutch 9 at the end of the current cycle and will cause reengagement of the main clutch to complete its second phase of operation to return the racks from their advanced positions.

Having thus described the invention, what we desire to secure by United States Patent is:

1. In a calculating machine having calculating mechanism including a plurality of independently operable devices, and drive means therefor; the combination of a first cyclic clutch between said drive means and one of said devices, said clutch being operable through two successive phases, means for arresting said clutch at the completion of each of said phases, means for initiating operation of said clutch, a second cyclic clutch between said drive means and another of said devices, means operable by said first clutch during a first one of said phases thereof for causing initiation of operation of said second clutch, means operable by said second clutch for initiating operation of said first clutch through the second phase thereof, and selectively settable means for disabling said initiating means for said second clutch and for rendering said arresting means ineffective to arrest said first clutch at the completion of the first of said phases.

2. In a calculating machine having calculating mechanism including a plurality of independently operable devices and drive means therefor; the combination of a first cyclic clutch between said drive means and one of said devices, said clutch being operable through two successive phases, means for arresting said clutch at the completion of each of said phases, means for initiating operation of said clutch, a second cyclic clutch between said drive means and another of said devices, means selectively settable into either of two conditions and operable by said first clutch, said selectively settable means being effective in one of said conditions thereof to cause initiation of operation of said second clutch and effective in the other of said conditions to render said arresting means inoperative to arrest said first clutch at the completion of the first of said phases.

3. In a calculating machine having calculating mechanism including a plurality of independently operable mechanisms; and drive means therefor; the combination of a first cyclic clutch between said drive means and one of said mechanisms, said clutch being operable through two successive phases, means including a clutch control member for initiating and terminating operation of said clutch, spring means for actuating said clutch control member to terminate operation of said clutch after either of said phases thereof, a second cyclic clutch between said drive means and another of said mechanisms, a device for initiating operation of said second clutch, actuating means operable by said first cyclic clutch, and selectively settable means operable by said actuating means and effective in one condition thereof to permit operation of said spring means and to cause operation of said initiating device for said second clutch, said selectively settable means being effective in another condition thereof to prevent said operation of said spring means.

4. In a calculating machine having calculating mechanism including a plurality of independently operable devices; and a motor therefor; the combination of means including a first cyclic clutch between said motor and one of said devices, said clutch being operable through two successive phases, means including a depressible key for initiating operation of said clutch, means including a second cyclic clutch between said motor and another of said devices, means controlled by said first clutch during a first one of said phases thereof for causing initiation of operation of said second clutch, means operable by said second clutch during any predetermined one of a number of cycles thereof for initiating operation of said first clutch through the second phase thereof, and means including a second depressible key for initiating operation of said first clutch and for rendering said second clutch initiating means ineffective and for causing said first clutch to effect operation of said first initiating means during said first phase thereof.

5. In a calculating machine having calculating mechanism including a plurality of independently operable devices; and a motor therefor; the combination of means including a first cyclic clutch between said motor and one of said devices, said clutch being operable through two successive phases, means for initiating operation of said clutch, means including a second cyclic clutch between said motor and another of said devices, means controlled by said first clutch during a first one of said phases thereof for causing initiation of operation of said second clutch, means controlled by said second clutch during any predetermined one of a number of cycles thereof for initiating operation of said first clutch through the second phase thereof, and a second means for initiating operation of said first clutch and for rendering said second clutch initiating means ineffective and for causing said first clutch to effect operation of said first initiating means during said first phase thereof.

6. In a calculating machine having calculating mechanism including a plurality of independently operable devices; and a motor therefor; the combination of means including a first cyclic clutch between said motor and one of said devices, said clutch being operable through two successive phases, means for arresting said clutch at the completion of each of said phases, means including a depressible key for initiating operation of said clutch, means including a second cyclic clutch between said motor and another of said devices, means controlled by said first clutch during a first one of said phases thereof for causing initiation of operation of said second clutch, means for arresting said second clutch at the completion of a cycle thereof, means for selectively rendering said last mentioned arresting means effective or ineffective, means controlled by said last mentioned means upon rendering said arresting means effective for initiating operation of said first clutch through the second phase thereof, and means including a second depressible key for initiating operation of said first clutch and for rendering said second clutch initiating means ineffective and for rendering said arresting means for said first clutch ineffective at the completion of said first phase thereof.

7. In a calculating machine having calculating mechanism including a plurality of independently operable devices; and drive means therefor; the combination of a first cyclic clutch between said drive means and one of said devices, said clutch being operable through two successive phases, a control member for said clutch movable to clutch engaging and disengaging positions, spring means for normally moving said control member to clutch disengaging position to disengage said clutch at the end of each of said phases thereof, a second cyclic clutch between said drive means and another of said devices, a second control member for said second clutch, a device operable by said first clutch including an interponent settable into one position wherein said interponent is capable of moving said first mentioned control member to clutch engaging position before the end of a first phase thereof whereby to enable said first clutch to continue uninterrupted through two phases thereof, said interponent being settable into a second position wherein said interponent is capable of moving said second control member to clutch engaging position and incapable of moving said first mentioned control member to clutch engaging position.

8. In a calculating machine having calculating mechanism including a plurality of independently operable devices; and drive means therefor, the combination of a first cyclic clutch between said drive means and one of said devices, said clutch being operable through two successive phases, a control member for said clutch movable to clutch engaging and disengaging positions, means for normally moving said clutch control member to clutch disengaging position to disengage said clutch at the end of each of said phases thereof, a second cyclic clutch between said drive means and another of said devices, a second control member for said second clutch, means for moving said second control member to clutch engaging and disengaging positions, a device operable by said first clutch including an interponent settable into one position wherein said interponent is capable of moving said first mentioned control member to clutch engaging position before the end of a first phase thereof whereby to cause said first clutch to continue uninterrupted through said two phases thereof, said interponent being settable into a second position wherein said interponent is capable of moving said second control member to clutch engaging position.

9. In a calculating machine having calculating mechanism including a plurality of independently operable devices; and drive means therefor, the combination of, a first cyclic clutch between said drive means and one of said devices, said clutch being operable through successive phases, a control member for engaging and disengaging said clutch, means for normally causing said control member to disengage said clutch at the end of each of said phases thereof, a second cyclic clutch between said drive means and another of said devices, a second control member for engaging and disengaging said second clutch, a device operable by said first clutch during one of said phases thereof including an interponent settable into one position wherein said interponent is capable of rendering said means ineffective, said interponent being settable into a second position wherein said interponent is capable of causing said second control member to engage said second clutch.

10. In a calculating machine having calculating mechanism including a plurality of independently operable devices; and drive means therefor, the combination of a first cyclic clutch between said drive means and one of said devices, said clutch being operable through successive phases, a control member for engaging and disengaging said clutch, means for normally causing said control member to disengage said clutch at the end of each of said phases thereof, a second cyclic clutch between said drive means and another of said devices, a second control member for engaging and disengaging said second clutch, a device operable by said first clutch during one of said phases thereof including an interponent settable into one position wherein said interponent is capable of rendering said means ineffective, said interponent being settable into a second position wherein said interponent is capable of causing said second control member to engage said second clutch, and means operable by said second clutch during any predetermined one of a number of cycles thereof for causing said first mentioned control member to re-engage said first clutch.

11. In a calculating machine having calculating mechanism including a plurality of independently operable devices; and drive means therefor, the combination of a first cyclic clutch between said drive means and one of said devices, said clutch being operable through successive phases, a control member for engaging and disengaging said clutch, means for normally causing said control member to disengage said clutch at the end of each of said phases thereof, a second cyclic clutch between said drive means and another of said devices, a second control member for engaging and disengaging said second clutch, a device operable by said first clutch during one of said phases thereof including an interponent settable into one position wherein said interponent is capable of rendering said means ineffective, said interponent being settable into a second position wherein said interponent is capable of causing said second control member to engage said second clutch, means operable by said second clutch during any predetermined one of a number of cycles thereof for causing said first mentioned control member to engage said first clutch, spring means for normally maintaining said interponent in one of said positions, means comprising a depressible key for causing said first mentioned control member to engage said first clutch, and means comprising a second depressible key for causing said first mentioned control member to engage said first clutch and for moving said interponent to the other of said positions.

12. In a calculating machine having calculating mechanism including a plurality of independently operable devices; and a motor therefor; the combination of means including a first cyclic clutch between said motor and one of said devices, said clutch being operable through two successive phases, a clutch control element movable to cause engagement and disengagement of said clutch, spring means for moving said control element to cause disengagement of said clutch at the end of each of said phases thereof, means comprising a depressible key for moving said clutch control element to cause engagement of said clutch, means including a second cyclic clutch between said motor and another of said devices, a second clutch control element movable to cause engagement and disengagement of said second clutch, mechanism controlled by said first clutch during a first one of said phases thereof for moving said second control element to cause engagement of said second clutch, a second spring means operable to move said second clutch control element to cause disengagement of said second clutch at the end of each cycle thereof, means selectively settable into either of two conditions and operable by said second clutch, said selectively settable means being effective in one of said conditions thereof to prevent operation of said second spring means, said selectively settable means being settable in another of said conditions thereof to permit operation of said second spring means and to move said first clutch control element to cause engagement of said first mentioned clutch, and means including a second depressible key for moving said first mentioned clutch control element to cause engagement of said first clutch and for rendering said mechanism ineffective and for preventing operation of said first mentioned spring means upon the completion of a first phase of said first clutch.

ROBERT E. BOYDEN.
EDWARD P. DRAKE.

(References on following page)

REFERENCES CITED

The following references are of record in the file of this patent:

UNITED STATES PATENTS

| Number | Name | Date |
|---|---|---|
| 2,068,899 | Anneren et al. | Jan. 26, 1937 |
| 2,367,386 | Crossman | Jan. 16, 1945 |
| 2,399,890 | Pott | May 7, 1946 |
| 2,419,760 | Britten, Jr. | Apr. 29, 1947 |
| 2,467,441 | Noller et al. | Apr. 19, 1949 |

OTHER REFERENCES

Ser. No. 262,552, Kiel (A. P. C.), published May 25, 1943.